Dec. 28, 1965
F. W. KUSSY ETAL
3,226,500
UNIVERSAL UNITARY HANDLE FOR SWITCHES
Filed Aug. 30, 1962
8 Sheets-Sheet 1
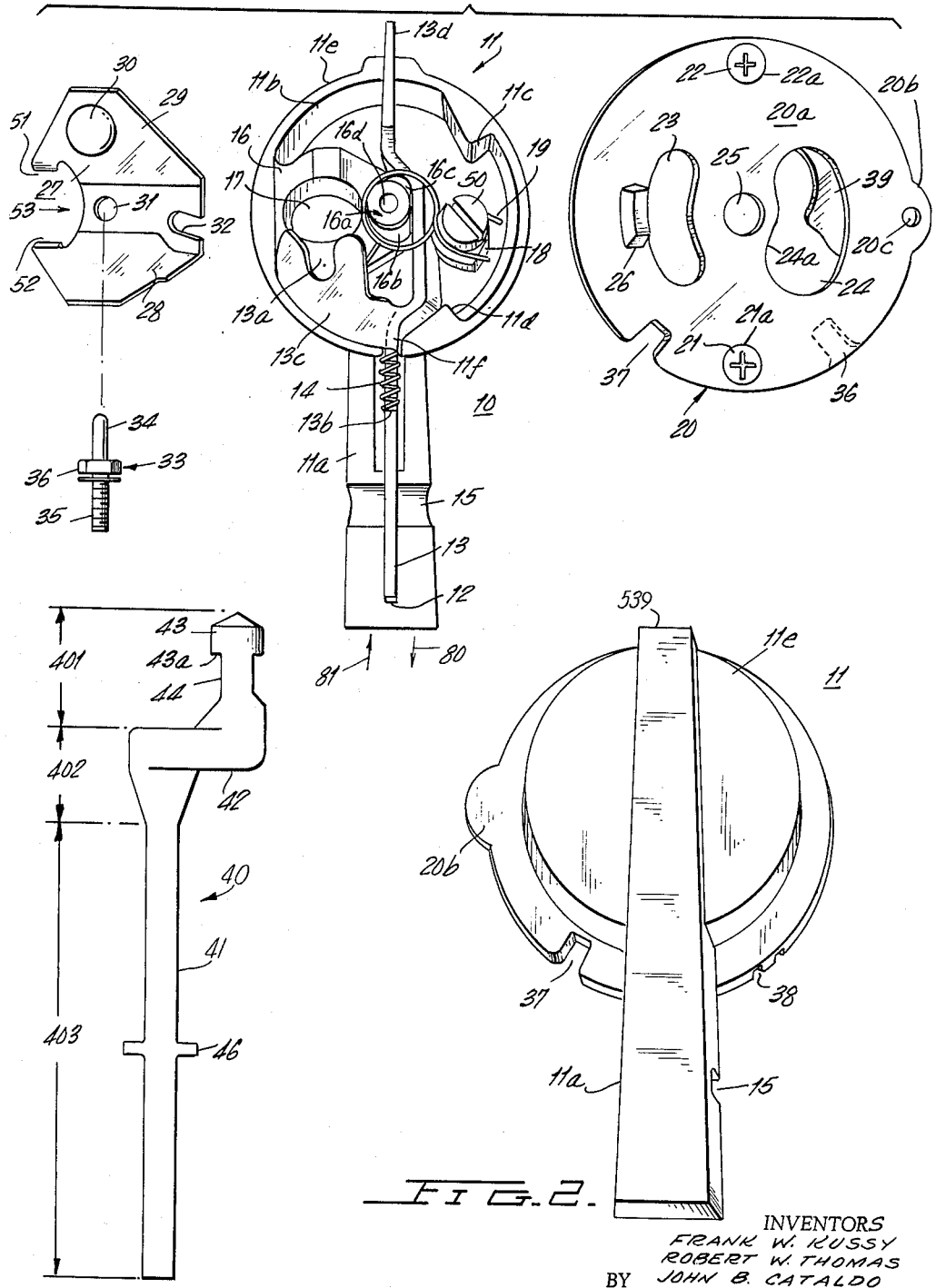
INVENTORS
FRANK W. KUSSY
ROBERT W. THOMAS
BY JOHN B. CATALDO
ANDREW J. KRALIK
OSTROLENK, FABER, GERB & SOFFEN
ATTORNEYS Dec. 28, 1965   F. W. KUSSY ETAL   3,226,500
UNIVERSAL UNITARY HANDLE FOR SWITCHES
Filed Aug. 30, 1962    8 Sheets-Sheet 2
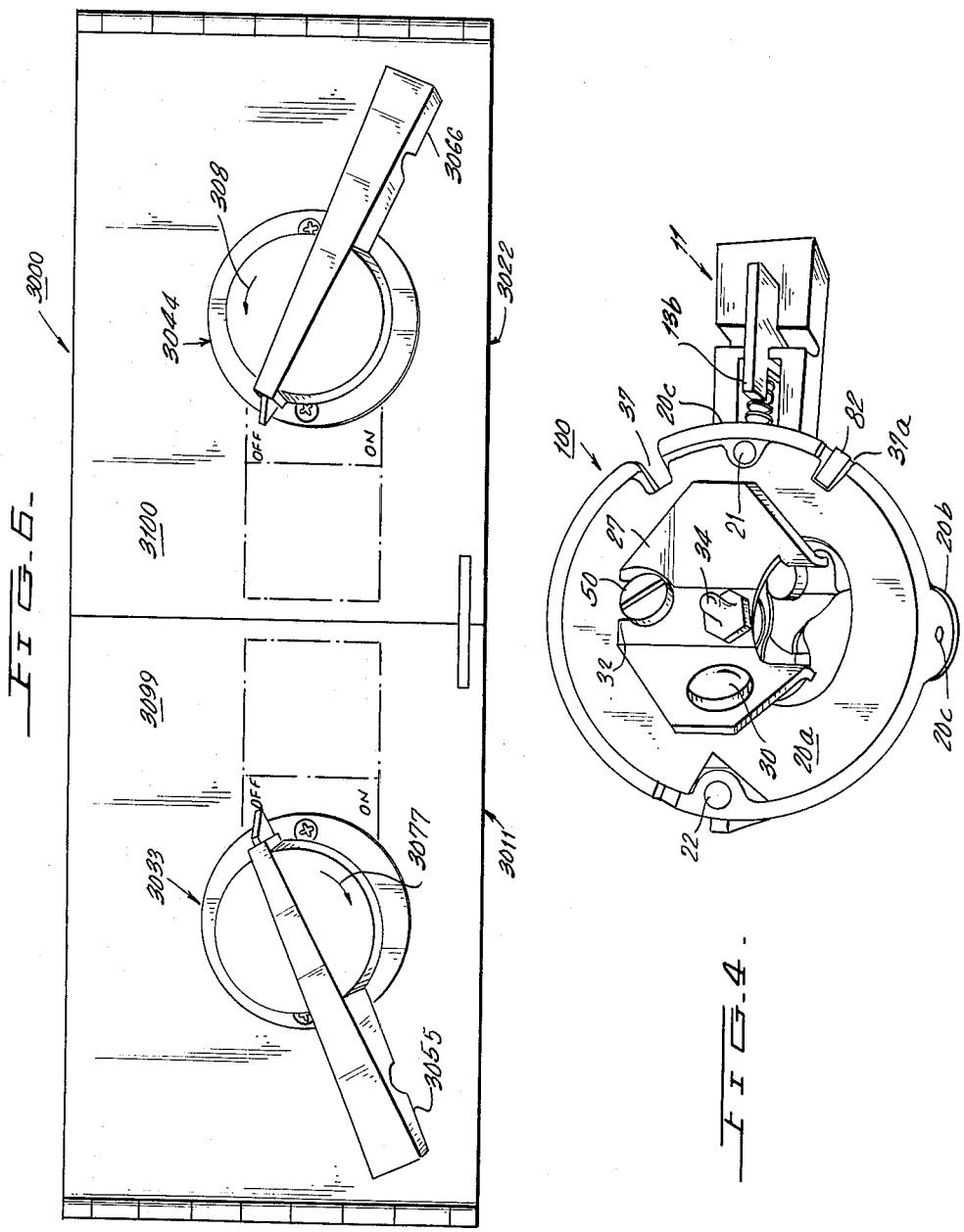
INVENTORS
FRANK W. KUSSY
ROBERT W. THOMAS
BY JOHN B. CATALDO
ANDREW J. KRALIK
OSTROLENK, FABER, GERB & SOFFEN
ATTORNEYS

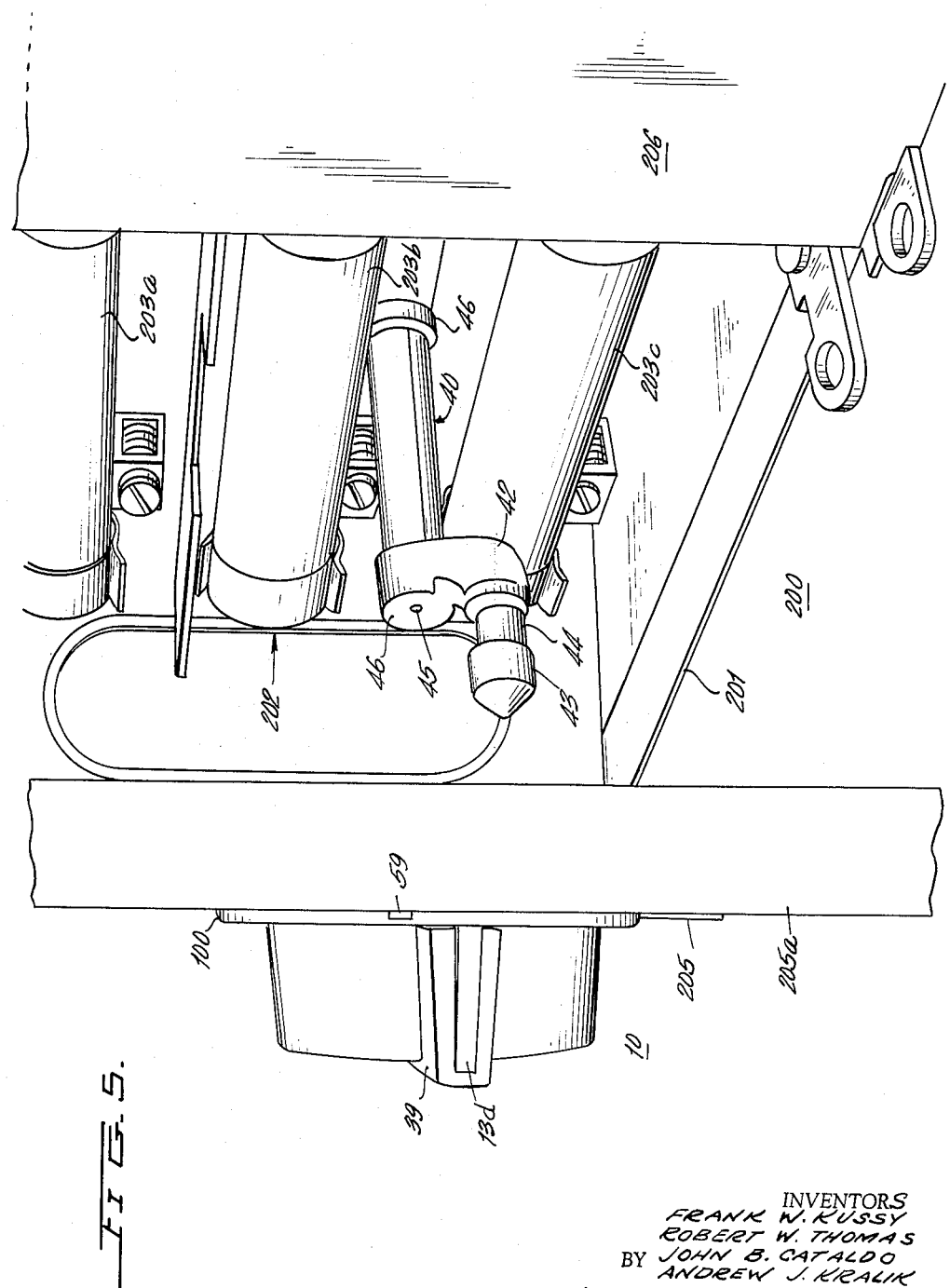

Dec. 28, 1965 F. W. KUSSY ETAL 3,226,500
UNIVERSAL UNITARY HANDLE FOR SWITCHES
Filed Aug. 30, 1962 8 Sheets-Sheet 4

INVENTORS
FRANK W. KUSSY
ROBERT W. THOMAS
JOHN B. CATALDO
BY ANDREW J. KRALIK

OSTROLENK, FABER, GERB & SOFFEN
ATTORNEYS

Dec. 28, 1965  F. W. KUSSY ETAL  3,226,500
UNIVERSAL UNITARY HANDLE FOR SWITCHES
Filed Aug. 30, 1962  8 Sheets-Sheet 5
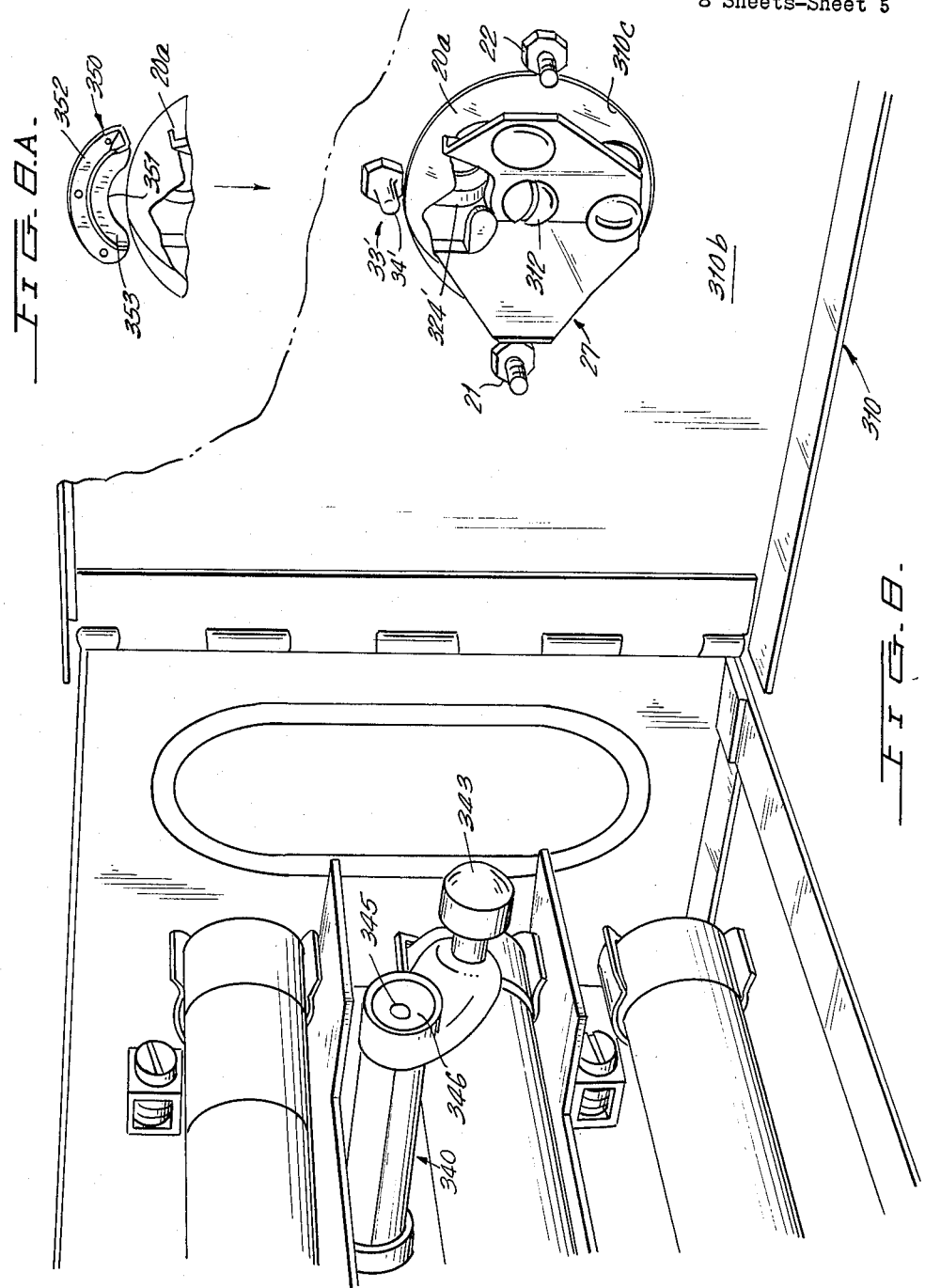
INVENTORS
FRANK W. KUSSY
ROBERT W. THOMAS
BY JOHN B. CATALDO
ANDREW J. KEALIK
OSTROLENK, FABER, GERB & SOFFEN
ATTORNEYS

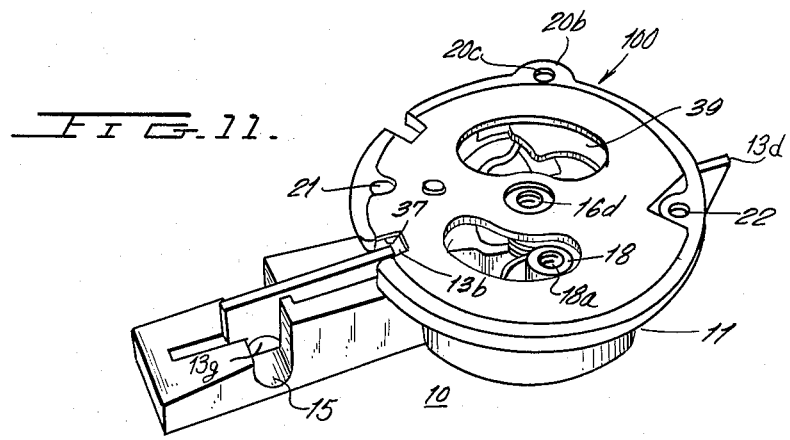
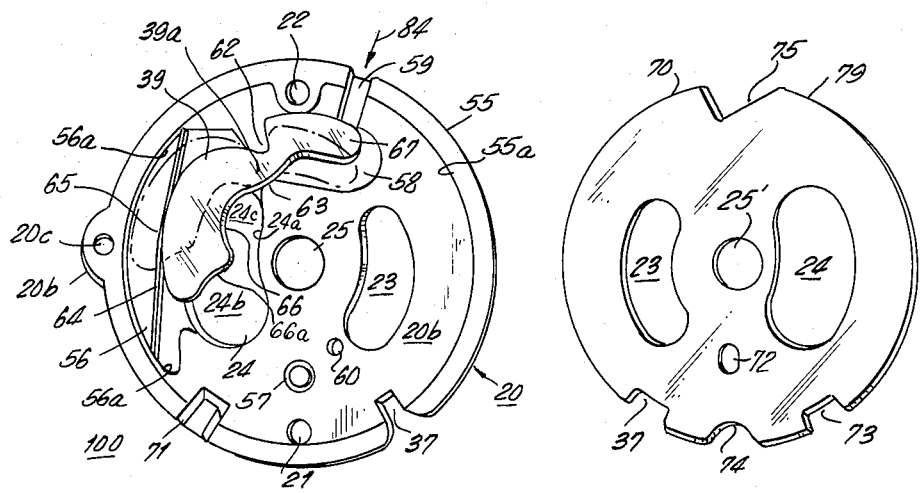
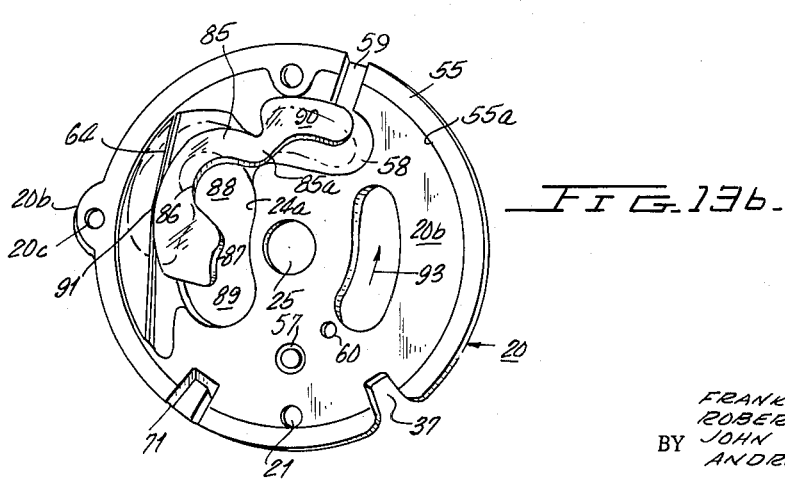

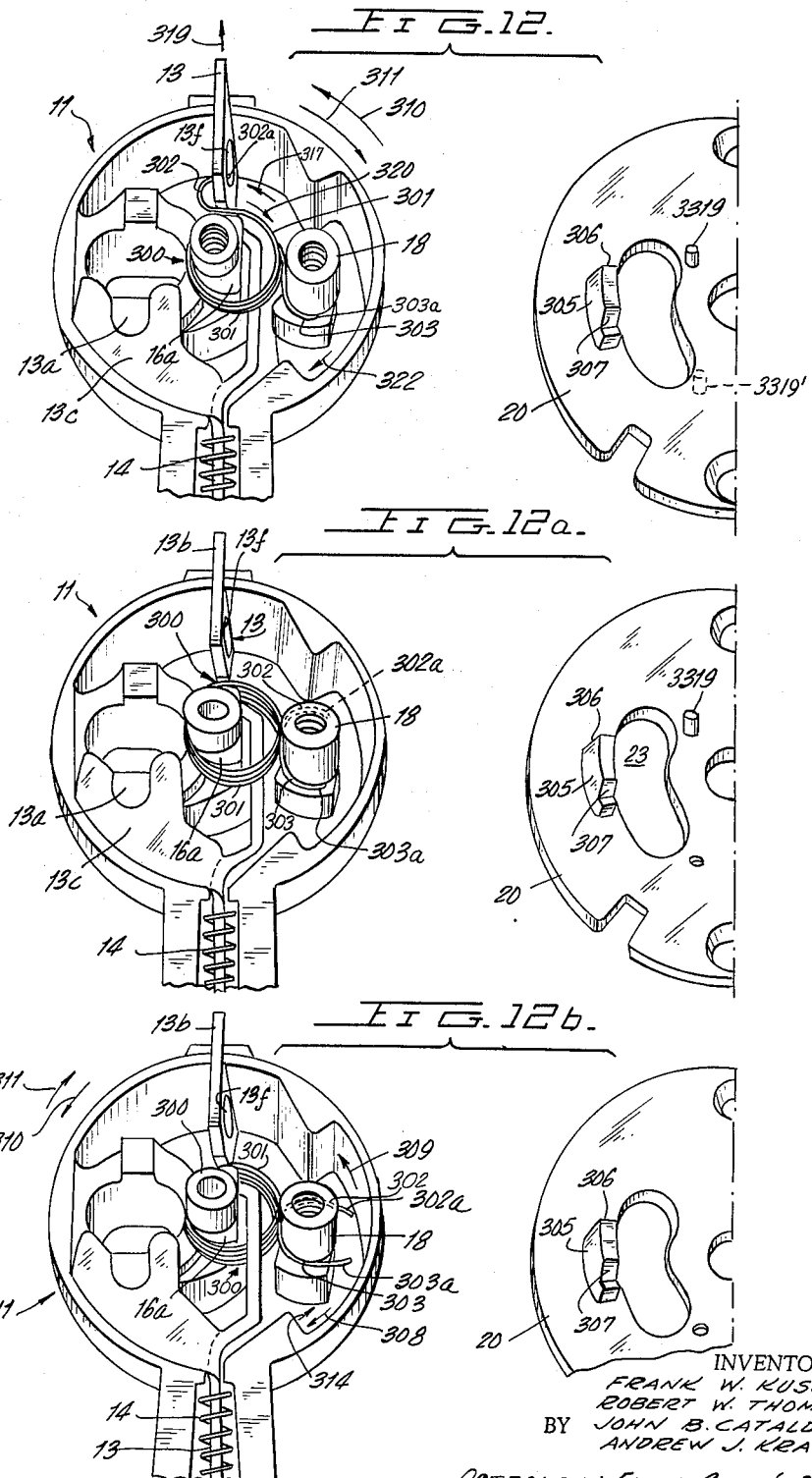

United States Patent Office 3,226,500
Patented Dec. 28, 1965

3,226,500
UNIVERSAL UNITARY HANDLE FOR SWITCHES
Frank W. Kussy, Birmingham, Robert W. Thomas, St. Clair Shores, John B. Cataldo, Bloomfield Hills, and Andrew J. Kralik, Detroit, Mich., assignors to I-T-E Circuit Breaker Company, Philadelphia, Pa., a corporation of Pennsylvania
Filed Aug. 30, 1962, Ser. No. 220,356
14 Claims. (Cl. 200—50)

This invention relates to circuit interrupters and more particularly to a unitary operating handle assembly for circuit interrupters having a universal configuration for operating circuit interrupters having dissimilar operating movements and further including novel interlock means to prevent opening of the circuit interrupter enclosure when the enclosure is in a variety of operating positions.

A wide variety of circuit interrupters which are presently in use, are so designed as to be operated by means of an operating handle assembly which is positioned upon a panel board, while the circuit interrupter proper is housed within the panel board assembly. This arrangement (with the panel board properly grounded) provides an adequate insulating barrier between the operator and the circuit interrupters positioned within the panel board housing. The panel board further serves as a protective means for buffering the results of any arcing or explosions which may occur within the panel board assembly.

In arrangements of this type, it becomes necessary to provide an operating handle assembly which functions in a safe, reliable manner, thus insuring that the necessary circuit interrupter operations are satisfactorily performed. In addition, in circuit interrupter installations of this general type, it is quite often desirable to have the capability of locking the circuit interrupter into a specific position so as to prevent any tampering therewith. In addition thereto, it becomes advantageous to provide a circuit interrupter arrangement, having the capability of preventing ingress through the panel board cover when the circuit interrupter is in its fully closed position. Another desirable feature is to lock the panel board enclosure so as to prevent ingress to the circuit interrupter when the circuit interrupter is in its tripped position. When designing circuit interrupters, it therefore becomes necessary to design a special purpose handle assembly which is unique from other such handle assemblies in order to perform functions which differ from the functions which prior art handle assemblies are capable of performing.

The device of the instant invention has a unique arrangement which enables the handle assembly of the invention to adapt itself to a plurality of different circuit interrupter applications and which is further enabled to perform a variety of the functions described above, while at the same time being a universal assembly. That is, the handle assembly has one basic design which requires relatively minor manual adjustments therein so as to provide an operating handle which is adapted to perform the functions desired by the user. This arrangement thereby completely eliminates the necessity for the design of a variety of different operating handle assemblies, while at the same time providing operating handle assemblies which are capable of performing all of the functions required by a variety of different circuit interrupters.

The handle assembly of the instant invention is comprised of a handle portion which is accessible from without the circuit interrupter enclosure. An operating mechanism, functioning under control of the handle portion, has the capability of moving the circuit interrupter to its closed and open positions upon appropriate manipulation of the assembly handle portion. A rotary arm is provided, which is keyed to the circuit interrupter high-speed operating mechanism, which arm has its opposite end positioned to be engaged by the operating handle assembly operating mechanism. This rotary arm is adapted to be engaged by, and the assembly operating mechanism is adapted to engage, the rotary arm at two positions. This arrangement provides a more positive coupling therebetween, thus providing both, more simple and substantially more reliable actuation and operation of the circuit interrupter by the operating handle assembly.

The operating mechanism includes a projection which is adapted to engage the rotary member at a first of the engageable positions and further includes an opening therein adapted to be engaged by a projection provided on the rotary member. A camming means is positioned so as to surround the engageable portions of the rotary arm and the operating mechanism in order to guide these engageable members into proper alignment during closure of the panel board cover.

A slidable member is positioned within a cavity formed in the assembly handle portion and is adapted to engage the rotary member projection when moved to a first position so as to prevent opening of the circuit interrupter cover member after the operating handle has moved the circuit interrupter to its fully closed position. A plurality of means are provided for padlocking the handle assembly in this position so as to prevent tampering therewith. With the handle assembly in this position, a second interlock means is provided which in addition to preventing the opening of the circuit interrupter cover means, further prevents movement of the circuit interrupter to, or towards its open position.

In applications where it is desirable to provide a handle assembly which prevents opening of the circuit interrupter cover member when the circuit interrupter is in its open position, the operating mechanism is designed so as to have a portion thereof, which is partially cut away and which may be very easily removed when being mounted in the field, so as to be slidably engaged by the slidable member mentioned above, so as to permit engagement of this slidable member with the rotary member, preventing opening of the circuit interrupter cover means.

In applications where it is desirable to mount circuit interrupters having dissimilar operating movements in a side-by-side, or other like arrangements, the operating mechanism is so designed as to adapt itself to operate the first circuit interrupter to its closed position by rotating in a first direction and simply by the additional mounting of the single projecting member. The same universal operating mechanism is adaptable to control the other of the side-by-side mounted circuit interrupters to its closed position by rotation in the reverse direction. This arrangement is highly advantageous in circuit interrupter installations wherein the panelboard is comprised of circuit interrupters having cover members which are hinged at their opposing ends and which have their opposite edges positioned adjacent to one another when the panelboard covers are in the closed position. Thus, the operating handle assembly provides a symmetrical arrangement, which upon simple observation, positively identifies the status of each circuit interrupter.

In applications where it is desirable to use a circuit interrupter in enclosures of varying depths or to use different circuit interrupters in the same panelboard unit, wherein all of the circuit interrupters are operated rotary actuating shafts which rotate about an axis perpendicular to the switch cover, the rotary actuating shafts are constructed of varying sizes to accommodate any size switch or enclosure. The rotary actuating shaft may also be constructed of separate interlocking parts which, when joined together form the actuating shaft. It is then possible to make each part of varying lengths to provide for the variety of switches and enclosures which may be employed with the handle assembly.

In applications where it is desirable to translate a rotary handle movement about an axis parallel to the switch cover to a rotary movement about an axis perpendicular to the switch cover, as described previously, translating means may be provided to perform this function. Translating means of this type which may be employed with the device of the instant invention are set forth in U.S. Patent #2,741,684 entitled Operating Handle Adapter issued April 10, 1956 to John Brumfield and in pending U.S. application Serial No. 231,761, entitled Rotary Motion Translating Means for Use With Linearly Moving Handles, filed October 19, 1962, now Patent No. 3,180,964 issued April 27, 1965, with both the aforementioned patents having been assigned to the assignee of the instant invention.

In cases where it is desired to prevent opening of the unit or circuit interrupter cover when the circuit interrupter is in its fully closed position, without providing padlock means for this purpose, the operating handle assembly includes a member which engages the rotary arm when the handle assembly is in the closed position, so as to prevent opening of the panelboard cover member unless and until the operating handle is moved to the circuit interrupter to the open position. The operating mechanism is provided with an opening having a unique configuration for insertion of a defeater means enabling opening of the panelboard cover member without operating the circuit interrupter to its fully open position. If it is desired to prevent opening of the panelboard cover member with the circuit interrupter in its fully open position, a member is provided which may be substituted for the member of the operating mechanism which prevents opening of the cover member with the circuit breaker in its on position. This member is simply substituted for the first member upon removal thereof so as to provide the aforementioned function. The opening having the unique configuration is again adaptable for receipt of a defeater means permitting disengagement of the rotary member by the operating mechanism so as to permit opening of the cover member with the circuit interrupter in its fully open position. The locking members employed for the aforementioned purposes are dual purpose, in that the first such member described above will prevent opening of the cover member with the circuit interrupter in the fully closed position when the handle assembly is mounted in a first manner and further prevents opening of the cover member with the circuit interrupter in the fully open position when the handle assembly is mounted in the reverse manner. This is likewise true of the second locking member which is substituted for the first member, thus providing the universal handle assembly with substantial flexibility.

The handle operating mechanism is further provided with universal biasing means for biasing the rest position of the handle assembly into a predetermined orientation prior to use thereof. The three most widely used orientations would be the handle fully open, fully closed and intermediate positions, each having its own distinct advantages, depending upon the use to which the handle assembly is put. The operating mechanism is therefore adapted so as to receive the universal biasing means in any one of the three positions, depending upon the orientation of the handle assembly which is desired to be employed.

It is therefore one object of this invention to provide an operating handle assembly for circuit interrupters and the like, having novel interlock means for preventing any attempt to open the panelboard unit cover with the circuit breaker being positioned either in the fully on, or the open position.

Another object of this invention is to provide an operating handle assembly for use with circuit interrupters and the like, having a novel operating mechanism configuration enabling use of the operating handle assembly with circuit interrupters having dissimilar operating movements.

Another object of this invention is to provide an operating handle assembly for circuit interrupters and the like, which includes interlock means for preventing any attempts to open the panel board unit cover with the circuit interrupter in the on position, which means is in addition to the padlocking interlock means also provided therein.

Still another object of this invention is to provide an operating handle assembly for use with circuit interrupters and the like, having a universal biasing means adaptable to bias the handle assembly to a variety of rest positions dependent only upon the mounting of the universal biasing means.

Another object of this invention is to provide an operating handle assembly for use with circuit interrupters and the like, which includes a novel operating mechanism for aligning the handle assembly with the circuit interrupter rotary actuating member upon closure of the panelboard unit cover structure, which configuration is adaptable to circuit interrupters having different operating movements.

Still another object of this invention is to provide an operating handle assembly for use with circuit interrupters and the like, having a novel operating mechanism adapted to engage the circuit interrupter rotary actuating member at at least two different positions to permit simpler and more reliable movement thereof, under control of the operating handle assembly.

Another object of this invention is to provide for a switch with a rotary movement, an operating shaft which engages the handle in the way already described, and which is formed of interlocking sections which can be combined in different ways to provide the same handle movement regardless of the distance between the cover and the circuit interrupter, and regardless of the fact that the pivot of the handle in the cover is on the same axis or a different but parallel axis as the axis of the switch rotating shaft.

Another object of the invention is to provide a handle assembly in one compact unit which can be attached to the cover by simple means and which can actuate any switch shaft having an axis of rotation and an engaging surface cooperating with the handle at identical positions.

Another object of the invention is to provide an actuator for a handle assembly which has a substantially square shaped shaft which can be attached to a circuit interrupter having different positions, and therefore, allows positioning of the handle either horizontally or vertically in relationship to the switch.

These and other objects will become apparent when reading the accompanying specification and drawings in which:

FIGURE 1 is a plan view showing the operating handle assemble of this invention, partially disassembled.

FIGURE 2 shows the operating handle assembly of FIGURE 1, fully assembled.

FIGURE 3 is a side plan view of the circuit interrupter rotary arm, employed to couple the operating handle assembly of FIGURES 1 and 2, with the circuit interrupter.

FIGURE 4 is a perspective view of the operating handle assembly of FIGURE 2 viewing the operating handle assembly from the back.

FIGURE 5 shows the operating handle assembly of FIGURE 2 mounted to a panelboard unit cover member which is shown partially open.

FIGURE 6 is a front view of a circuit interrupter side-by-side panelboard installation employing the operating handle assemblies of the instant invention.

FIGURE 8 shows the remaining circuit interrupter of FIGURE 6 with its associated cover door open so as to, show an alternative embodiment of the operating handle assembly employed therein.

FIGURE 8a shows a perspective view of an alternative embodiment for the handle assembly projecting pin of FIGURE 8.

FIGURE 9 shows an enlarged view of the back of the handle assembly shown in FIGURE 4 with some of the elements removed.

FIGURE 10 shows the operating handle assembly of FIGURE 2 engaging the rotary member of FIGURE 3 wherein some of the elements of the handle assembly have been removed for purposes of clarity.

FIGURE 11 shows another perspective view of the operating handle assembly of FIGURE 4 with the padlocking interlock means shown in the locked position.

FIGURE 12 is a plan view of a portion of the operating handle assembly of the invention showing the universal bias means in greater detail.

FIGURE 12a shows the universal bias means of FIGURE 12 being mounted in an alternative position.

FIGURE 12b shows still another mounting arrangement of the universal bias means of FIGURES 12a and 12, respectively.

FIGURES 13a and 13b show two preferred embodiments respectively of the operating handle assembly locking means employed for preventing opening of the circuit interrupter panelboard unit cover members during actuation thereof.

Figure 7:
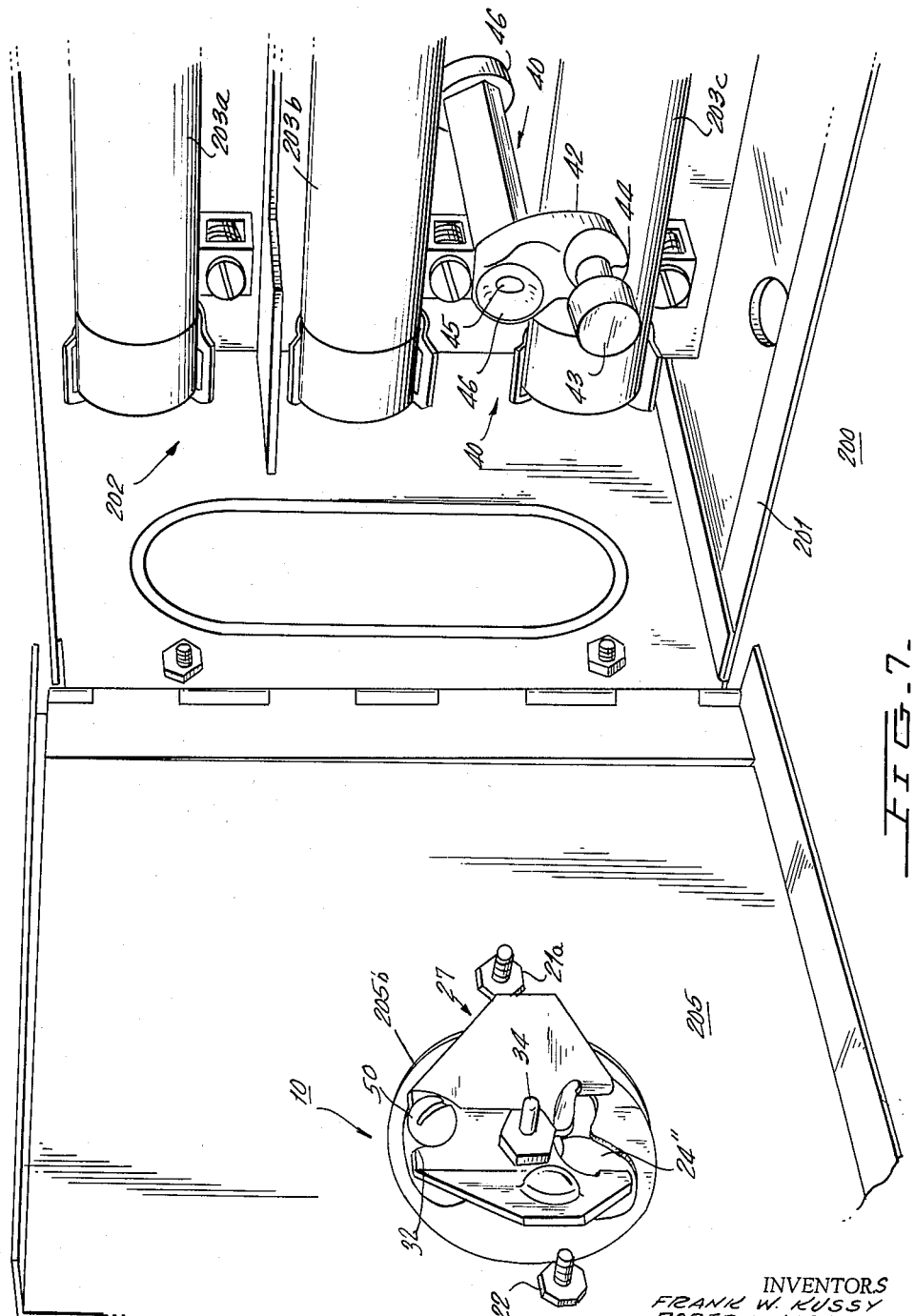
FIGURE 7 shows one of the circuit interrupters of FIGURE 6 with the cover member being in a fully open position.

Referring now to the drawings:

FIGURE 1 shows the handle assembly of the instant invention in the partially disassembled manner, which assembly 10 is comprised of a handle 11 having a gripping portion 11a and a substantially circular portion 11e having a recess 11b. An elongated slot 12 is provided in the handle portion 11a which slot extends to the circular portion 11e and which receives the elongated member 13. The recess 11b contains a molded projection 16 of a configuration which forms a cavity 17 for receiving the end of the rotary handle shown in FIGURE 3, in a manner to be more fully described. An extending branch 13c of member 13 having a substantially U-shaped slot 13a is adapted to slide substantially over cavity 17 so as to engage the end of the rotary handle shown in FIGURE 3, in a manner to be more fully described. Member 13 is biased to the position shown in FIGURE 1 by means of a spring member 14 positioned between a shoulder 11f in gripping portion 11a and a shoulder 13b provided on member 13.

A second projection 18 is provided in recess 11b and cooperates with a universal spring member 19 to bias the handle assembly to a predetermined orientation in a manner to be more fully described. The molded projection 16 has a portion 16a which forms a shouldered boss having shoulder portions 16b and 16c which are employed for the purpose of slidably supporting the central portion of the stationary plate 20, to be more fully described. Shouldered boss 16a has a tapped aperture 16d for receipt of a fastening means 33 to secure the handle 11 to the stationary plate 20 and the panelboard unit cover means (not shown) in a manner to be more fully described.

The stationary plate 20 contains substantially arcuate slots 23 and 24. Arcuate slot 23 is adapted when properly positioned to have projection 18 extend therethrough and arcuate slot 24 is adapted to be positioned above cavity 17. A projection 26 provided adjacent the outer periphery of arcuate slot 23 is adapted to abut the shoulders 11c and 11d respectively, so as to provide the limiting action on the rotation of the handle member 11. A tab 20b is provided on plate 20a having a tapped aperture 20c. This aperture is provided for receiving projecting pin 34' in a manner to be more fully described with reference to the description of FIGURE 8.

An aperture 25 is provided in stationary plate 20 so as to permit the outermost end of shouldered boss 16a to extend therethrough. The surface 20a of stationary plate 20 is mounted to the handle portion 11 in such a manner that the surface 20a correctly faces the floor of the recess 11b and further, so that the opposing surface (not shown) of stationary plate 20 is completely exposed, as will be more fully described.

Plate 20 is provided with apertures 21a and 22a for receiving fastening members 21 and 22, respectively. These members are adapted to secure the stationary plate 20 to the circuit breaker panelboard unit cover (not shown), in a manner to be more fully described. A portion of a locking member 39 is shown, extending into the region of the slot 24 of stationary plate 20 and is adapted to cooperate with the opposing edge 24a of slot 24 in such a manner as to lock the handle assembly 10 to the end of the rotary arm shown in FIGURE 3, in a manner to be more fully described.

A wing member 27 is provided for the purpose of alignment of the handle assembly 10 with the rotary member of FIGURE 3 during closure of the circuit breaker panel board cover, in a manner to be more fully described. Wing element 27 is provided with a substantially U-shaped slot 32 which cooperates with fastening means 50 and an aperture 31 which cooperates with the fastening means 33 and tapped aperture 16d for fastening wing element 27 to the handle 11. The wing portions 28 and 29 of wing element 27 are so oriented as to urge the end of the rotary arm of FIGURE 3 into proper alignment, as will be more fully described. A substantially U-shaped slot 53 cooperates with flanges 28, 29 and flanges 51 and 52, in order to facilitate the alignment operation.

The fastening means employed to fasten the wing element 27 to the handle 11 consists of a fastening member 33 having a tapped portion 35 and a projecting portion 34. The tapped portion is threadedly engaged by the tapped aperture 16d of the handle 11. Washer 36 is provided to produce rigid fastening. Fastening means 50 resides in slot 32 and is secured within a tapped opening in projection 18 to prevent rotation of wing member 27 with respect to handle 11.

The handle 11 shown in FIGURE 2 has a tapered configuration which is of the nature of a pointer, the end 539 of which points to a position indicating means (not shown) apprising the operator of the position of the circuit interrupter control by the handle 11. The slot 37 (see also FIGURE 1) is adapted to receive the shoulder 13b of member 13, when it is desired to lock the handle assembly into a predetermined position. Handle portion 11a is provided with a notched portion 15, which cooperates with a slot (not shown) in member 13, for receiving a padlock therethrough. A second slot (not shown) is provided at the opposite end of member 13, which provides an alternative means of padlocking the handle assembly.

The stationary plate 20 of FIGURE 1 is one element of the stationary assembly 100 shown in FIGURE 13a, which is adapted to be mounted to a panel board unit cover (not shown) in a manner to be more fully described. The assembly 100 is comprised of the plate 20, a locking member 39, a portion of which is shown exposed in FIGURE 1, a bias member 64 and a cover plate 70. The stationary plate 20 shown in FIGURE 13a shows the face 20b of plate 20, which is opposite the face 20a shown in FIGURE 1. This face has a raised edge 55 which substantially surrounds the central portion of face 20b and which has an inter-periphery 55a which has dimensions slightly greater than the outer-periphery 79 of cover plate 70. The surface 20b of stationary plate 20 has two recesses, 56 and 58 formed therein of a unique configuration adapted for the receipt of the locking member 39. The recess 56 is further adapted to position the biasing spring member 64 against edge 65 of locking member 39 so as to maintain locking member 39 substantially in the position as shown in FIGURE 13a. A circular-shaped projection 57 is adapted to engage an aperture 72 in cover member 70 for proper alignment thereof relative to the stationary plate 20.

FIGURE 11 shows the stationary mounting assembly 100 positioned within the recess 11b of the handle 11 so that the apertures 23 and 25 receive the projections 18 and 16a respectively and so that the aperture 24 is positioned substantially above the cavity 17 in handle 11.

FIGURE 5 shows the handle assembly 10 mounted in its normal operating position to cover door 205 of circuit interrupter assembly 200. The door is hinged at the edge (not shown), opposite edge 205a of door 205 so that upon closure thereof edge 205a is positioned adjacent the panel-board surface 206 of the circuit interrupter housing 201.

A circuit interrupter 202 is positioned in housing 201 and is of the type described in copending U.S. application No. 212,890, entitled Circuit Interrupter, filed July 27, 1962, by John B. Cataldo et al., and assigned to the assignee of the instant invention. The circuit interrupter disclosed in the above mentioned U.S. application is of the multiphase type which includes current limiting fuses 203a–203c, associated with each phase thereof. It should be understood that this invention does not rely upon the particular configuration of the circuit interrupter described in the above mentioned U.S. application, but is adaptable for use with any circuit interrupter of the type which may be controlled by a rotary movement.

The handle assembly 10 is shown mounted to the surface of cover 205 such that the stationary mounting assembly 100 is secured to cover 205 by fastening means 21a and 22a, as shown in FIGURE 1. The handle assembly 10 is coupled to the circuit interrupter 202 by a rotary arm 40 which is engaged by the handle assembly 10 for control thereof in a manner to be more fully described.

The rotary arm 40 can best be seen in FIGURE 3 and is comprised of a main body portion 41 having a substantially rectangular cross section with an off-setting portion 42 at its upper end. A substantially circular flange 46 is positioned along the body portion 41 and is provided for the purpose of cooperating with a shoulder opening (not shown) in circuit interrupter 202 of FIGURE 5. In order to insure insertion of rotary arm 40 to the proper depth, a head 43 is provided on the off-set portion 42, having a thinner neck portion 44 dividing head 43 from off-set portion 42. The head and neck portions 43 and 44 respectively, are designed so as to be engageable with the operating handle assembly to provide the interlock features of the handle assembly 10.

Arm 40 can be constructed to have three interlocking interchangeable sections. For example, arm 40 as shown in FIGURE 3 can have the sections 401, 402 and 403. In this manner each section can be formed of varying lengths enabling the handle assembly of the instant invention to be employed with a variety of enclosures and switches having varying depths and dimensions. Instead of building the rotary arm itself of different sections, also a die of different sections could be used for a cast arm to insure that one basic die can be used for a number of actuating means.

The square shape of the shaft provides the possibility to engage the shaft in four different positions in the switch, therefore allowing four different relationships between switch base and enclosure cover.

FIGURE 4 shows a view of the handle assembly 10 showing the face of the stationary mounting assembly 100, which is positioned against the surface of the cover 205, shown in FIGURE 5. The apertures 21 and 22 receive the fastening means 21a and 22a respectively, shown in FIGURE 1 which secure the mounting assembly 100 to the panel board cover 205 shown in FIGURE 5.

FIGURE 11 further shows the tapped apertures 16d and 18a shown also in FIGURE 1, which are provided for threadedly engaging the fastening members 33 and 50, which are also shown in FIGURE 1. These fastening members secure the wing element 27 to the handle assembly shown in FIGURE 11 so that the final assembly appears as is shown in FIGURE 4. This is completed by placing the slot 32 of wing element 27 such that it engages the fastening member 50 beneath its head and so that the aperture 31 of wing element 27 is positioned immediately above aperture 16d of the handle assembly 10. Fastening member 33 is then positioned so that it threadedly engages tapped aperture 16d, thus producing the complete assembly as is shown in FIGURE 4. The assembly is then mounted to the panelboard cover in the following manner:

The panel board cover 205 is provided with an opening 205b (FIGURE 7) of dimensions sufficient to permit the protrusion of wing element 27 therethrough. Apertures (not shown) are also provided for receiving fastening means 21a and 22a. It should be noted that the opening 205b in panel board cover 205 is positioned so as to center the handle assembly mounted to the cover, relative to the rotary arm 40.

Upon closure of the door, or cover 205, the handle assembly 10 and rotary arm 40 approach one another in order to provide proper alignment thereof. The head portion 43 of rotary arm 40 is guided by the cammed surfaces 28 and 29 so that the head 43 moves into the opening 24″ which is defined by the arcuate shaped slot 24, shown in FIGURE 1 and the edge 66 (see FIGURE 13a) of locking member 39, which projects into the arcuate slot 24. It should be noted that upon closure of the door, or cover 205, if the rotary arm 40, due to engagement by wing portions 28 and 29, should be rotated so that its head 43 is guided toward engagement with fastening member 50, the door 205 will fail to move to its fully closed position, thus apprising the operator of an improper engagement between the handle assembly 10 and the rotary arm 40.

When the panel board unit cover has moved to its fully closed position, the handle assembly 10 engages the rotary arm 40 in two places. The rotary arm 40 is provided with an aperture 45 in its off-set portion 42, which can best be seen in FIGURE 7. Aperture 45 is surrounded by a conical or tapered surface 46. The function of this tapered surface 46 and aperture 45 is to first guide and then engage projection 34 of fastening means 33, simultaneously therewith, head 43 of rotary arm 40 enters the opening 24″ so that it becomes seated in the cavity 17, which can best be seen in FIGURE 1. When the cover 205 of the panel board unit is moved to its fully closed position, the positions of the rotary arm 40 and handle assembly 10, are shown in FIGURE 10. It should be noted that a number of the elements of the assembly and the cover have been removed in order to show more clearly the position of these members.

The interlock operation of the slidable member 13 shown in FIGURE 1 and FIGURE 9 is as follows:

Once the rotary arm 40 and handle assembly 10 have moved relative to one another so that the head 43 of arm 40 has entered the cavity 17 of handle 11, the member 13 may then be moved to its interlock position.

The normal position for member 13 is shown in FIGURE 1. This position is assumed in the absence of any outside forces due to the force of spring member 14, causing member 13 to be biased in a direction shown by arrow 80 in FIGURES 1 and 9. In order to provide the interlock feature, the member 13 is moved in the direction shown by arrow 81 of FIGURES 1 and 9, causing the branch portion 13c of member 13 to assume the position shown in FIGURE 10. In this position the slot 13a of branch member 13c substantially surrounds the neck portion 44 of rotary arm 40, which can best be seen in FIGURE 10. In order to maintain member 13 in the position shown in FIGURE 10, a padlock (not shown) may be inserted through the aperture 13f provided at the head 13d of arm 13, or alternatively a padlock may be passed through the aperture 13g provided in the opposite end of member 13, which when positioned relative to the slot 15 of gripping portion 11a of handle 11 may easily accommodate such padlock means. This can best be seen in FIGURE 11.

Thus, with the rotary arm 40 and handle assembly 10 in the position shown in FIGURE 10, and with the interlock imposed by member 13 upon rotary arm 40, the cover 205 of the circuit interrupter panel board may not be opened due to the locking engagement between slot 13a of branch member 13c which engages the shoulder 43a which lies between the neck and head 44 and 43 respectively of rotary arm 40.

In addition thereto, a circuit breaker may not be operated from the position which it occupies at the time interlock is imposed upon rotary arm 40 by member 13. This is due to the edge 13b of arm 13 which enters a notch 37 provided in stationary mounting assembly 100 and which can best be seen in FIGURE 11 of the drawings. With the notch 37 in the position shown in FIGURE 11 so that it receives edge 13b of arm 13 any rotation whatsoever of handle 11 is prevented. Thus it is possible to simultaneously prevent opening of the panelboard cover 205 and prevent movement of the circuit interrupter 202 shown in FIGURE 5 by means of the single interlock member 13.

It should be noted that in order that member 13 be permitted to move to the locking position, the handle 11 must be so aligned relative to the stationary mounting assembly 100 so that edge 13b of member 13 is permitted to enter the cooperating notch 37 provided in the stationary mounting assembly 100. This can be more clearly understood upon consideration of FIGURE 4 which shows the entire operating handle assembly in its fully assembled position with the handle 11 rotated relative to the stationary mounting assembly 100 so that the edge 13b of member 13 is not in alignment with the notch 37. In this position, the edge 13b will abut the periphery 20c of the stationary mounting assembly 100 to prevent slot 13a from engaging the shoulder 43a of rotary arm 40.

The notch 37 is positioned along the periphery 20c of the stationary mounting assembly 100 so that the edge 13b of member 13 and the notch 37 are in alignment when the operating handle assembly has moved the circuit interrupter to its on position. Thus, in this condition, the circuit interrupter is in its on position. Ingress by means of the panel board cover is prevented and movement of the circuit interrupter to its open position is likewise prevented by virtue of the interlock member 13.

As can best be seen in FIGURE 4, a portion of the periphery 20c of stationary mounting assembly 100 has been so machined as to enable relatively easy removal of the metal piece 82 so as to provide a second notch along the stationary mounting assembly 100. This machined portion is so positioned along the periphery 20c of assembly 100 so that alignment between edge 13b and notch 37a is achieved when the handle assembly has operated the circuit interrupter 202 of FIGURE 5 to its open position. Thus it is possible with the same operating handle assembly to provide interlock functions with the circuit breaker in either its on or off positions. The machined portion may easily be removed in the field when the circuit interrupter is being installed so that there is no necessity for removal of the metallic segment 82 unless and until this particular function is desired by the user.

FIGURE 6 shows a circuit interrupter installation 3000, comprised of first and second circuit interrupters 3011 and 3022 which circuit interrupter employs the novel operating handle assembly of the instant invention, namely, the handle assemblies 3033 and 3044 respectively. In this particular application, it is highly desirable to provide circuit interrupters having operating handle assemblies which occupy similar positions when the circuit interrupters operated thereby are in similar operating positions (that is, their closed or open positions respectively). For example, FIGURE 6 shows both circuit interrupters 3011 and 3022 positioned in the fully open or off position. It can be noted that both handle assemblies 3033 and 3044 are positioned so that their handle portions 3055 and 3066 respectively, both point in the downward direction. Thus, with the circuit interrupters 3011 and 3022 both in their fully open, or off positions, operating handle 3033 must be rotated in a clockwise direction, as shown by arrow 3077, and operating handle 3066 must be rotated in a counterclockwise direction, as shown by arrow 308 to move circuit interrupters 3011 and 3022 respectively to their fully closed or on positions. Thus, with this arrangement normally, two uniquely designed handles must be provided to produce the desired functions while at the same time maintaining the uniformity of the type shown in FIGURE 6.

The universal operating handle assembly of the instant invention however, is completely adaptable to operation of the types required by the circuit interrupters 3011 and 3022 shown in FIGURE 6. This arrangement can best be seen in considering FIGURE 7 and FIGURE 8, wherein FIGURE 7 shows the interior of the circuit interrupter assembly 3011 while FIGURE 8 shows the interior of the circuit interrupter assembly 3022. FIGURE 7 was described previously and shows one embodiment of the operating handle assembly 10 and the manner in which it engages rotary arm 40 provided therein.

In order, however, to provide the reverse rotation with the same operating handle assembly, the fastening means 33′ similar to fastening means 33 shown in FIGURE 1, is not positioned in the manner shown in FIGURE 7, but is mounted directly to the stationary plate 20 by means of the tapped aperture 20c provided in the integral tab 20b of the stationary plate 20. With this arrangement it is necessary to provide an aperture 310C of a diameter sufficient to permit passage therethrough of the wing member 27. Two additional apertures are necessary for the passage therethrough of fastening means 21 and 22 so as to secure the stationary plate 20 to the door 310b. A third aperture is provided and is positioned so as to be in alignment with the tapped aperture 20c of the stationary plate tab 20b. The dimensions of this aperture are not critical so long as it is at least somewhat greater in diameter than the tapped aperture 20c. With this arrangement when the door 310b of FIGURE 8 is moved to its fully closed position, the projection 34′ engages the tapered edge 346 and subsequent thereto the aperture 345 of rotary arm 340, while the opening 324′ receives the head 343 of rotary arm 340. With this arrangement the reverse rotation of operating handle 11 with the arrangement of FIGURE 8 causes the same rotation of rotary arm 340 relative to the rotation of rotary arm 40 of FIGURE 7.

The stationary plate is therefore so designed as to be completely utilizable with either handle assemblies 3033 and 3044 shown in FIGURE 6 and in using such handle assemblies for either left or right-hand installations as shown in FIGURE 6. The identical openings are made for receipt of the fastening means 21 and 22 and the wing member 27 while for the right-hand cover installation, as shown in FIGURE 8 the only difference is that a fourth aperture, or opening, is provided which is in alignment with the stationary tab 20b in order to appropriately receive the fastening means 33′. This design has the advantage of permitting an almost identically uniform operation for attaching such handle assemblies to panel board covers be they for left, or right-hand hinged doors and further, provides adequate rigidity for supporting the fastening means 33′ when it is positioned as shown in FIGURE 8 so that it will withstand repeated usage without relying upon the cover 310b for the support of fastening means 33′.

With this arrangement, that is, with the arrangement of either FIGURE 7 or FIGURE 8, the projecting pin 34′ is the center of rotation of the associated operating handle and is either on the center of rotation of the handle 11 itself (see FIGURE 1) or substantially close thereto as to provide a more reliable arrangement having a minimum of play between and among the operating portions thereof. Thus, with the arrangement of circuit interrupters, such as circuit interrupters 301 and 302, shown in FIGURE 6, this enables circuit interrupter installations of the type shown in FIGURE 6 to provide the uniform handle positions shown in that figure while at the same time enabling such assemblies to be achieved with only one universal operating handle assembly.

FIGURE 8a shows an alternative embodiment for the projecting pin 34' of FIGURE 8, which embodiment is comprised of a crescent-shaped bearing member 350 having a circular-shaped surface 351 for embracing the rounded portion of the rotary arm 340 adjacent the aperture 345. The lower flange 352 is provided for securing bearing member 350 to either door 205 or tab 20b in any suitable manner. The guiding flange 353 is arranged to properly position the rotary arm portion and guide it into engagement with the arcuate surface 351. The bearing member 350 acts in substantially the same manner as the projecting pin 34' for which it has been substituted by providing a pivoting means for the rotation of rotary arm 340. A second type of interlock function is performed by means of the stationary mounting assembly 100 and can best be understood in considering FIGURES 13a and 13b.

The stationary mounting assembly 100 of FIGURE 13a is provided with a locking member 39 which is positioned in the recesses 56 and 58 so that edges 66 and 66a thereof thereof project into the arcuate slot 24 in mounting plate 20 and so that the neck portion 39a is positioned between the pivoting edges 62 and 63 of stationary mounting plate 20. The leaf spring member 64 is positioned so that its ends abut the wall 56a of recess 56 and so that its intermediate portion abuts the edge 65 of locking member 39. This causes locking member 39 to be positioned as shown in FIGURE 13a. In this position the edges 66 and 66a of locking member 39 cooperate with the opposing edge 24a of the arcuate shaped slot 24 to form two major regions 24b and 24c therebetween.

With the stationary mounting assembly 100 of FIGURE 13a mounted to the handle 11 shown in FIGURE 1 the interlock feature provided is as follows:

The handle assembly secured to the panelboard cover is moved into engagement with the circuit breaker rotary arm 40 by closure of the door 205. This is identical to the operation described previously with respect to FIGURE 7. In this position the circuit interrupter and the handle assembly both occupy their fully open positions.

When door 205 moves to its fully closed position, the head 43 of rotary arm 40 enters the cavity 17 of handle 11, which can best be seen in FIGURES 1 and 10. The stationary mounting assembly is so oriented at this time that the head portion 43 of rotary arm 40 enters the region 24b of the irregularly shaped opening 24" (see FIGURE 7). In this position the configuration of the opening 24b is such that the head 43 of rotary arm 40 may easily be inserted into, or removed from cavity 17.

Upon rotation of operating handle assembly 10 to the on position, this rotation is imparted to rotary arm 40 causing it to move clockwise (relative to the position shown in FIGURE 13a), so that the head and neck portions 43 and 44 respectively, move into the region 24c of the irregularly shaped opening 24". In this position, the edge 66 of locking member 39 abuts the shoulder or ledge portion 43a of rotary arm 40, thus preventing relative movement between the rotary arm 40 and the operating handle assembly 10 in much the same manner as was previously described relative to the locking member 13, shown in FIGURE 10. The basic distinction between that locking operation and the instant locking operation however is in the fact that the handle assembly 10 is not permanently locked into the on position, but may be moved to the off position simply by operation of the operating handle to the appropriate position. Thus, this interlock function provides the feature of preventing the opening of the circuit interrupter panel board door with the circuit interrupter housed therein being in the on position. Thus, in order to open the panel board door, the circuit interrupter must be operated by means of the operating handle assembly to the fully open position.

If, however, it is desired to open the panel board door for the circuit interrupter assembly without operating the breaker to its off position, this may be performed by means of introducing a defeater member (not shown) into the groove 59, which permits communication with the recess 58 provided in stationary mounting plate 20. Thus, by applying a force in the direction shown by arrow 84 upon the portion 67 of locking member 39, locking member 39 may be moved against the force of spring 64 to the position shown by the dotted configuration of FIGURE 13a, causing the distance between edge 66 of locking member 39 and edge 24a of arcuate slot 24 to increase, thereby releasing locking member 39 from engagement with the shoulder portion 43a of rotary arm 40.

If the reverse operation is desired, a stationary mounting plate 20, shown in FIGURE 13b, may be provided with a locking member 85, having edges 86 and 87 which cooperate with the edge 24a of stationary mounting plate 20 to form regions 88 and 89. The edge 91 of locking member 85 abuts against the spring member 64 in the same manner as described previously with respect to locking member 39.

With this arrangement, the mounting plate 20 is angularly oriented to the circuit interrupter door so that upon closure of the panel board door, the head 43 of rotary arm 40 enters the region 88 of the irregularly shaped opening. In this position, however, the handle assembly for the circuit interrupter is in the fully closed position.

The circuit interrupter handle assembly is then rotated counterclockwise relative to the stationary plate shown in FIGURE 13b and marked by arrow 93 so that the head and neck portions of rotary arm 40 enter into the region 89 of the irregularly shaped opening. This places the shoulder 43a of the rotary arm 40 against the edge 87 of locking member 85 so that with the handle assembly and similarly with the circuit interrupter in the off position, the door of the circuit interrupter panelboard may not be opened. However, it should be noted that in order to open the door of the circuit interrupter panel board without operating the operating handle assembly, a defeating member (not shown) may be inserted into the groove 59 which communicates with recess 58 in the same manner as described with respect to FIGURE 13a so that locking member 85 may be moved against the force exerted by spring member 64 into the position shown by the dotted line configuration of FIGURE 13b. This permits the head portion 43 of the rotary arm 40 to be easily removed from the handle assembly stationary mounting portion even though the circuit interrupter handle assembly has not been moved to its fully closed position since the edge 87 of the locking member 85 has moved far enough away from the edge 24a of stationary mounting plate 20 to permit removal of head 43.

It should be noted that this arrangement lends itself readily to installations of the type shown in FIGURE 6 wherein the operating handle assemblies 303 and 304 must be rotated in opposite directions (as was previously described) in order that they both may be able their associated circuit interrupters to the fully closed or on position. Thus, with this arrangement, the locking member 39 of FIGURE 13a is employed in the handle assembly of FIGURE 8, whereas, the locking member 85 of FIGURE 13b is employed in the handle assembly of FIGURE 7. Thus, the dissimilar locking members actually provide the similar locking functions due to the symmetrical arrangement of the operating handles as shown in FIGURE 6 and further, due to the reverse directions through which these members are rotated.

In situations where the panel board cover for the circuit interrupter is moved to the open position, it is desirable to provide means for prepositioning the handle assembly to a desired orientation in order to facilitate some subsequent function to be performed by the operating handle assembly. For example, if the handle is biased to a mid-angular position between the fully open or fully closed positions, this alignment simplifies the camming of the handle to the rotary arm position occupied by the rotary arm for the circuit interrupter associated with the handle assembly. In circuit breaker applications, it is desirable to bias the handle assembly to the fully closed or on position since this permits a more accurate indication of the breaker position. The forces tending to keep the circuit breaker handle in the on position are not of a substantial nature and excessive handle weights could easily render an inaccurate position on the door of the panel board.

The universal operating handle of the invention being of a design having extreme flexibility, further provides biasing means of a universal type to provide a variety of handle positions when the circuit interrupter panel board cover is in the open position.

The bias means for providing positioning of the handle assembly at a point intermediate the off and on positions is shown in FIGURE 12b. The biasing means, or torsion spring 300, is comprised of a circular body portion 301 and extending arms 302 and 303. The body portion 301 is adapted to fit over the central projection, or boss 16, provided in the handle 11. The extending arms 301 and 302 are positioned on opposite sides of the projection 18 and are adapted so as to exert forces tending to drive the arms 302 and 303 against the circular projection 18. The stationary mounting plate 20 which cooperates with the handle 11 is provided with a projection 305 positioned adjacent arcuate slot 23. The projection 305 is provided with edges 306 and 307 which are dimensioned so as to abut the ends 302a and 303a of arms 302 and 303 respectively, when the stationary mounting plate 20 is mounted to the handle 11, in the manner shown in FIGURES 4 and 11 of the drawings.

The operation of this biasing member is as follows:
When the handle 11 is rotated counterclockwise in a direction shown by arrow 308, the end 303a of extending arm 303 abuts edge 307 of projection 305 causing arm 303 to move in a direction shown by arrow 308, relative to the projection 18, with the arm in fully on position. There will be no movement of the handle assembly due to the greater restraining forces exerted by the circuit interrupter operating mechanism (not shown).

Also, if the circuit interrupter handle assembly is moved in the counterclockwise direction, as shown by arrow 309 in FIGURE 12b, this causes the end 302a of arm 302 to abut the edge 306 of projection 305, causing arm 302 to move in a direction shown by arrow 309, relative to the projection 18. Again it should be understood that the circuit interrupter operating mechanism (not shown) exerts forces of a magnitude far exceeding the forces exerted by bias means 300 so as to prevent movement thereof. However, upon opening of the circuit interrupter panel board door, the handle 11 is disengaged from the rotary arm 40 (see FIGURES 7 and 8 for example), placing the positioning of handling assembly completely under the control of bias means 300. Thus, when either of the arms 302 or 303 have been moved in the directions shown by arrows 308 or 309, the force exerted by the arm which has been moved, such as for example the force exerted by arm 303, which has been moved by abutting edge 307 of projection 305, causes the operating handle 11 to be moved in the reverse direction, causing handle 11 to return to the neutral position intermediate the off and on positions, which position is shown in FIGURE 11.

The arrangement of FIGURE 12a is employed when it is desired to bias the handle assembly to the on position. This is done in the following manner:

The biasing means 300 is positioned around boss 16a in the same manner as described previously, with respect to FIGURE 12b. The extending arms 302 and 303 are positioned on the opposite sides of projection 18, in the same manner as previously described. It should be noted, however, that the arms 303 and 302 of FIGURE 12a are shorter than the arms 303 and 302 of FIGURE 12b so that they will not engage the edges 306 and 307 of projection 305. The arm 302 is then moved counterclockwise in the direction shown by arrow 317 (see FIGURE 12) so that its edge 302a abuts the point 13f of slidable member 13. The stationary mounting plate 20 has an aperture (not shown) for accommodating a pin 3319 which extends into the recess provided in handle 11 when the stationary mounting plate 20 and handle 11 are assembled, in the manner previously described.

With the members 11 and 20 in their assembled positions, the slider member 13 is moved slightly in the direction shown by arrow 319 causing the end 302a of arm 302 to become disengaged from point 13f of member 13. This frees arm 302 causing it to move in the direction shown by arrow 320. However, arm 302 is prevented from returning to its normal position, shown in FIGURE 12a, due to the pin 3319 which lies at a point intermediate projection 18 and point 13f of slidable member 13.

When the handle 11 is rotated clockwise (in the direction shown by arrow 311), to the fully off position, this causes arm 302 to move in the direction shown by arrow 317, relative to projection 18. The force of the charged spring member 300, however, will be insufficient to drive the handle assembly to its fully closed position due to the magnitude of the circuit interrupter operating mechanism (not shown), which exerts a far greater force thereby restraining movement of the handle 11 under control of the bias means 300. However, when the panelboard door is opened so that the handle 11 becomes disengaged from the rotary arm 40 (see FIGURE 7 for example), the bias means 300 then assumes control of handle 11 causing it to move in the direction shown by arrow 320 so that it returns to its fully closed position.

If it is desired to preposition the handle assembly to its off position, an arrangement similar to that of FIGURES 12–12a is provided, except that the pin 3319 is positioned at the opposite end of arcuate shaped slot 23, as shown in dotted fashion as designated by the numeral 3319'. With this arrangement, the lower arm 303 (see FIGURE 12) is moved, by means not shown, in the direction shown by arrow 322, by an amount sufficient for spring arm 303 to abut pin 3319'. The operation is identical to the operation of the bias means which engages the pin 3319, except that the handle arm will be biased to its fully tripped position when the panel board door is open.

It can therefore be seen that the instant invention provides an operating handle of a single design which is adapted to actuate circuit interrupters having operating means which function in reverse directions and which further provides interlock and biasing means for locking and biasing the handle respectively in a variety of positions regardless of the type of circuit interrupter for which the operating handle assembly is employed. All of these functions are provided without any change whatsoever in the handle assembly major components.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A panel board assembly comprising an enclosure having a door movable between an open and closed position, a circuit interrupter within said enclosure, a rotary member for controlling operation of said interrupter between on and off positions, said rotary member extending forward from said interrupter toward said door and having an offset arm at the forward end thereof, and a handle assembly for rotating said rotary member; said handle assembly comprising first means secured to said door; manually operable handle means rotatably mounted to said first means on the exterior side of said door for controlling rotation of the rotary member; second means mounted to said first means on the interior side of said door, said second means constructed and operatively positioned to engage and thereby align said rotary member with said handle assembly when the door is moved to its closed position, said handle means including third means slidably mounted in said handle means and positionable to lock the door when the door is moved to its closed position; rotation of said handle means operating the circuit interrupter between its OFF and ON positions; said first means having a first notched portion positioned to be engaged by said third means to prevent rotation of said handle means when the circuit interrupter is in the ON position; means biasing said third means away from said first notched portion; said third means including an arm extending towards the offset arm, said arm having a substantially U-shaped slot to receive and thereby lock the offset arm to said handle assembly when said third means is in engagement with said first notched portion to prevent opening of the door when the circuit interrupter is in the ON position.

2. A panel board assembly comprising an enclosure having a door movable between an open and closed position, a circuit interrupter within said enclosure, a rotary member for controlling operation of said interrupter between on and off positions, said rotary member extending forward from said interrupter toward said door and having an offset arm at the forward end thereof, and a handle assembly for rotating said rotary member; said handle assembly comprising first means secured to said door; manually operable handle means rotatably mounted to said first means on the exterior side of the door for controlling rotation of said rotary member; second means mounted to said first means on the interior side of the door, said second means constructed and operatively positioned to engage and thereby align the rotary member with the handle assembly when the door is moved to its closed position, said handle means including third means slidably mounted in said handle means and positionable to lock the door when the door is moved to its closed position; the rotation of said handle means operating the circuit interrupter between its OFF and ON positions; said first means having a first notched portion positioned to be engaged by said third means to prevent rotation of said handle means when said circuit interrupter is in the OFF position; a second portion of said first means constructed to be easily broken away from said first means to form a second notched portion; said second notched portion positioned to be engaged by said third means to prevent rotation of said handle means when the circuit interrupter is in the ON position; means biasing said third means away from said first and second notched portions; said third means including an arm extending towards the offset arm, said arm having a substantially U-shaped slot to receive and thereby lock the offset arm to said handle assembly when said third means is in engagement with said first notched portion to prevent opening of the door when the circuit interrupter is in either the ON or the OFF position.

3. A panel board assembly comprising an enclosure having a door movable between an open and closed position, a circuit interrupter within said enclosure, a rotary member for controlling operation of said interrupter between on and off positions, said rotary member extending forward from said interrupter toward said door and having an offset arm at the forward end thereof; and a handle assembly for rotating said member, said handle assembly comprising first means secured to said door; manually operable handle means rotatably mounted between off and on positions to said first means on the exterior side of the door for controlling rotation of the rotary member; second means mounted to said first means on the interior side of the door, said second means constructed and operatively positioned to engage and thereby align said rotary member with the handle assembly when the door is moved to its closed position, said handle means including third means slidably mounted in said handle means and positionable to lock the door when the door is moved to its closed position; the rotation of said handle means operating the circuit interrupter between its OFF and ON positions; said first means having a first notched portion positioned to be engaged by said third means to prevent rotation of said handle means when said circuit interrupter is in the ON position; means biasing said third means away from said first notched portion; said third means including an arm extending towards the offset arm, said arm having a substantially U-shaped slot to receive and thereby lock the offset arm to said handle assembly when said third means is in engagement with said first notched portion to prevent opening of said door when the circuit interrupter is in the ON position; said handle means having a recess to receive the end of the offset arm when the door is fully closed, said recess shaped to impart rotation of said rotary member when said handle means is rotated.

4. A panel board assembly as set forth in claim 3 in which the U-shaped slot cooperates with the recess to capture a portion of the offset arm when the third means engages the first notched portion.

5. A panel board assembly as set forth in claim 4 in which the handle means includes a slotted portion adjacent one end thereof, said third means having an aperture positioned to move into alignment with said slotted portion to accommodate a padlock for locking of said third means.

6. A panel board assembly as set forth in claim 3 in which the second means includes flanged portions adjacent said recess to guide the offset arm into said recess when the door is moved to the closed position; said rotary member having a recess at one end thereof adjacent the offset arm; said second means including fastening means having a projecting head received by said recess when the door is in the closed position; said projecting head and said recess cooperating to provide engagement between said handle assembly and said rotary member at two distinct locations providing reliable engagement therebetween to thereby simplify the manual rotation of said handle means.

7. A panel board assembly as set forth in claim 3 in which the first means is provided with an arcuate slot positioned so that any portion thereof is substantially in alignment with said recess as said handle means is rotated between its OFF and ON positions; a pivotally mounted locking means positioned in said first means substantially parallel to the panel board, biasing means abutting said locking means to urge a portion thereof to project into the region of said arcuate slot; said portion of said locking means having a configuration to permit passage of said offset arm through said arcuate slot when the rotary member is in a first angular position and prevent passage of the offset arm through said arcuate slot when the rotary member is in a second angular position.

8. A panel board assembly as set forth in claim 7 also including defeating means in said first means constructed to receive a key member for urging said locking means against said biasing means out of the region of said arcuate slot to permit passage of the offset arm through said arcuate slot.

9. A panel board assembly as set forth in claim 1 in which the handle means has a recess to receive the end of the offset arm when said door is fully closed, said recess shaped to impart rotation of the rotary member when said handle means is rotated; said first means including a stationary mounting plate having an arcuate slot positioned to be in continuous alignment with said recess when said handle means undergoes rotation; locking means; said mounting plate having a recess for receiving said locking means; said recess constructed to pivotally mount said locking means entered therein, the plane of movement of said locking means being substantially parallel to the door; bias means positioned in said mounting plate recess for urging said locking means into the region of said arcuate slot; said locking means having a cammed edge projecting into said arcuate slot and constructed to permit passage of said offset arm through said arcuate slot when the rotary member is in a first angular position and to permit passage of said offset arm when said rotary member is in a second angular position.

10. A panel board as set forth in claim 9 in which the rotary member has a recess at one end thereof adjacent the offset arm; fastening means having a tapered head; said mounting plate having a centrally located tapped aperture for receiving and positioning said fastening means to cause said rotary member recess to receive said tapered head, said handle assembly constructed to rotate said rotary member in the direction of rotation of said handle means, said door being alternatively constructed to receive said fastening means to cause said rotary member recess to receive said tapered head thereby causing rotation of said rotary member in a reverse direction of rotation of said handle means, and thus providing a symmetrical appearance in panel board installations having side-by-side mounted circuit interrupters.

11. A panel board assembly comprising an enclosure having a door movable between an open and closed position, a circuit interrupter within said enclosure, a rotary member for controlling operation of said interrupter between on and off positions, said rotary member extending forward from said interrupter toward said door and having an offset arm at the forward end thereof, and a handle assembly for rotating said member, said handle assembly comprising first means secured to said door; manually operable handle means rotatably mounted to said first means on the exterior side of the door for controlling rotation of the rotary member; second means mounted to said first means on the interior side of the door, said second means constructed and operatively positioned to engage and thereby align the rotary member with the handle assembly when the door is moved to its closed position; the rotation of said handle means operating the circuit interrupter between its OFF and ON positions; said handle means having a cavity with first and second projections integral with the base of said cavity; torsion spring means having a substantially circular central portion and first and second extending arms with said central portion positioned over said first projection, said first and second extending arms positioned on opposite sides of said second projection; said first means including a stationary mounting plate, a projection on said mounting plate extending towards said cavity and positioned between the arms of said spring means; said handle means rotatable between a first and a second position; said spring means biasing said handle means to a third position intermediate said first and second position when the door is open to facilitate alignment between said handle assembly and the rotary member.

12. A panel board assembly as set forth in claim 11 in which said mounting plate is provided with first and second apertures; a stop pin adapted for insertion into either of said apertures; said pin engaging one of said extending arms when positioned in said first aperture and engaging the other of said extending arms when positioned in the second aperture; said handle assembly biasing said handle means to said first position when said pin is inserted in one of said apertures and biasing said handle means to said second position when said pin is inserted in the other of said apertures thereby providing a universal handle assembly adapted to bias said handle means in a variety of positions.

13. A panel board assembly including an enclosure having first and second doors hinged for opening and closing, first and second circuit interrupters disposed within said enclosure and positioned in alignment with and behind said first and said second doors, respectively; a first and a second rotary operating member extending forwardly from the first and second interrupters, respectively; a first and a second handle assembly mounted to said first and said second doors, respectively; when said doors are closed said first and second assemblies engaging said first and second rotary members, respectively, for operation of the latter to control opening and closing of said interrupters; both of said rotary members operating in a first direction to bring about opening of their respective interrupters and operating in a second direction, opposite to said first direction, for closing of said interrupters, said first and second handle assemblies having a first and second rotary handle means, respectively, mounted for movement in said first and said second directions; said first handle assembly including means for imparting rotation to said first rotary member in said first direction in response to rotation of said first handle means in said first direction, and said second handle assembly including means for imparting rotation to said second rotary member in said first direction in response to rotation of said second handle means in said second direction.

14. A panel board assembly as set forth in claim 13 in which each of the rotary members is provided with an offset arm having a depression and each of said handle assemblies is provided with a pin means insertable into one of said depressions; each of said handle assemblies also having spaced camming formations which receive therebetween a part projecting forward from said offset arm; said pin means of said first handle assembly positioned between said camming formations of said first handle assembly and said pin means of said second handle assembly positioned remote from the camming formations of said second assembly.

References Cited by the Examiner
UNITED STATES PATENTS

| | | | |
|---|---|---|---|
| 2,806,099 | 9/1957 | Rexroad | 200—50 |
| 2,988,612 | 6/1961 | Hercules | 200—50 |

KATHLEEN H. CLAFFY, *Primary Examiner.*

BERNARD A. GILHEANY, *Examiner.*